United States Patent
Ikurumi et al.

[11] Patent Number: 5,841,539
[45] Date of Patent: Nov. 24, 1998

[54] THREE-DIMENSIONAL MEASURING APPARATUS AND THREE-DIMENSIONAL MEASURING METHOD

[75] Inventors: Kazuhiro Ikurumi, Katano; Masaharu Tsujimura, Osaka; Yoichiro Ueda, Nabari, all of Japan

[73] Assignee: Matsushita Electric Industrial Co., Ltd., Osaka-fu, Japan

[21] Appl. No.: 911,371

[22] Filed: Aug. 7, 1997

[30] Foreign Application Priority Data

Aug. 9, 1996 [JP] Japan .................................. 8-210914

[51] Int. Cl.[6] .......................... G01B 11/24; G01B 11/06; G01D 5/30; G01N 21/00
[52] U.S. Cl. .......................... 356/376; 356/381; 250/230; 250/559.19; 250/559.27; 250/559.06
[58] Field of Search ..................................... 356/375–387, 356/237–240, 429–431, 445–448; 250/559.01–559.49, 230

[56] References Cited

U.S. PATENT DOCUMENTS 4,118,127  10/1978  Klein et al. ............................. 356/431
5,008,558   4/1991  Koshinaka et al. ..................... 356/431
5,245,403   9/1993  Kato et al. .............................. 356/237

FOREIGN PATENT DOCUMENTS 5-312536  11/1993  Japan .

*Primary Examiner*—Frank G. Font
*Assistant Examiner*—Jason D. Vierra-Eisenberg
*Attorney, Agent, or Firm*—Wenderoth, Lind & Ponack, L.L.P.

[57] ABSTRACT

The three-dimensional measuring apparatus of the present invention includes an optical beam scanning unit for scanning a projected-and-depressed surface of an object with an optical beam while controlling the scanning operation, and a detector unit for receiving a reflected optical beam reflected by the projected-and-depressed surface through the scanning operation and for thereby measuring height information on the projections and depressions of the object, in which noise information due to noise generated during the control of the scanning operation with the optical beam is prevented from being transmitted as the height information from the detector unit.

12 Claims, 9 Drawing Sheets

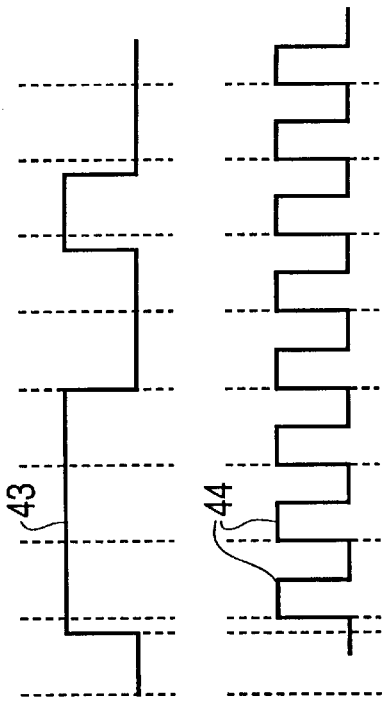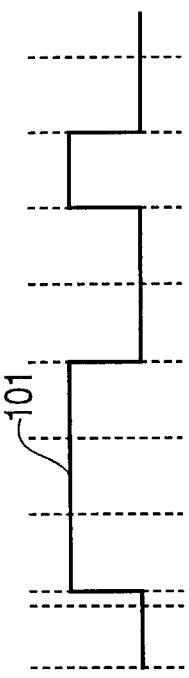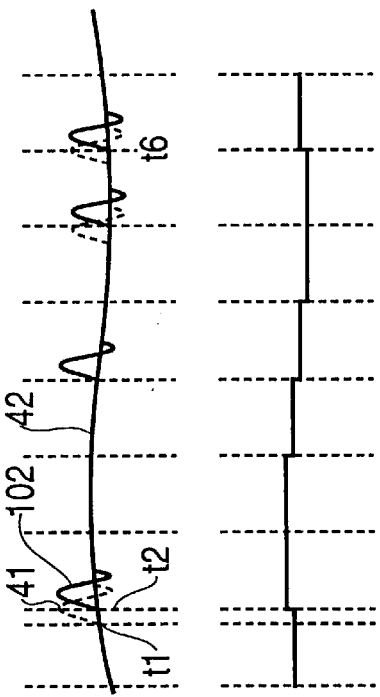
FIG. 2A MOTOR CURRENT (OUTPUT OF MOTOR CONTROLLER(5))
FIG. 2B OUTPUT OF OSCILLATOR(9)
FIG. 2C MOTOR CURRENT (OUTPUT OF CURRENT DRIVER(6))
FIG. 2D OUTPUT OF PSD(11)
FIG. 2E HEIGHT DATA

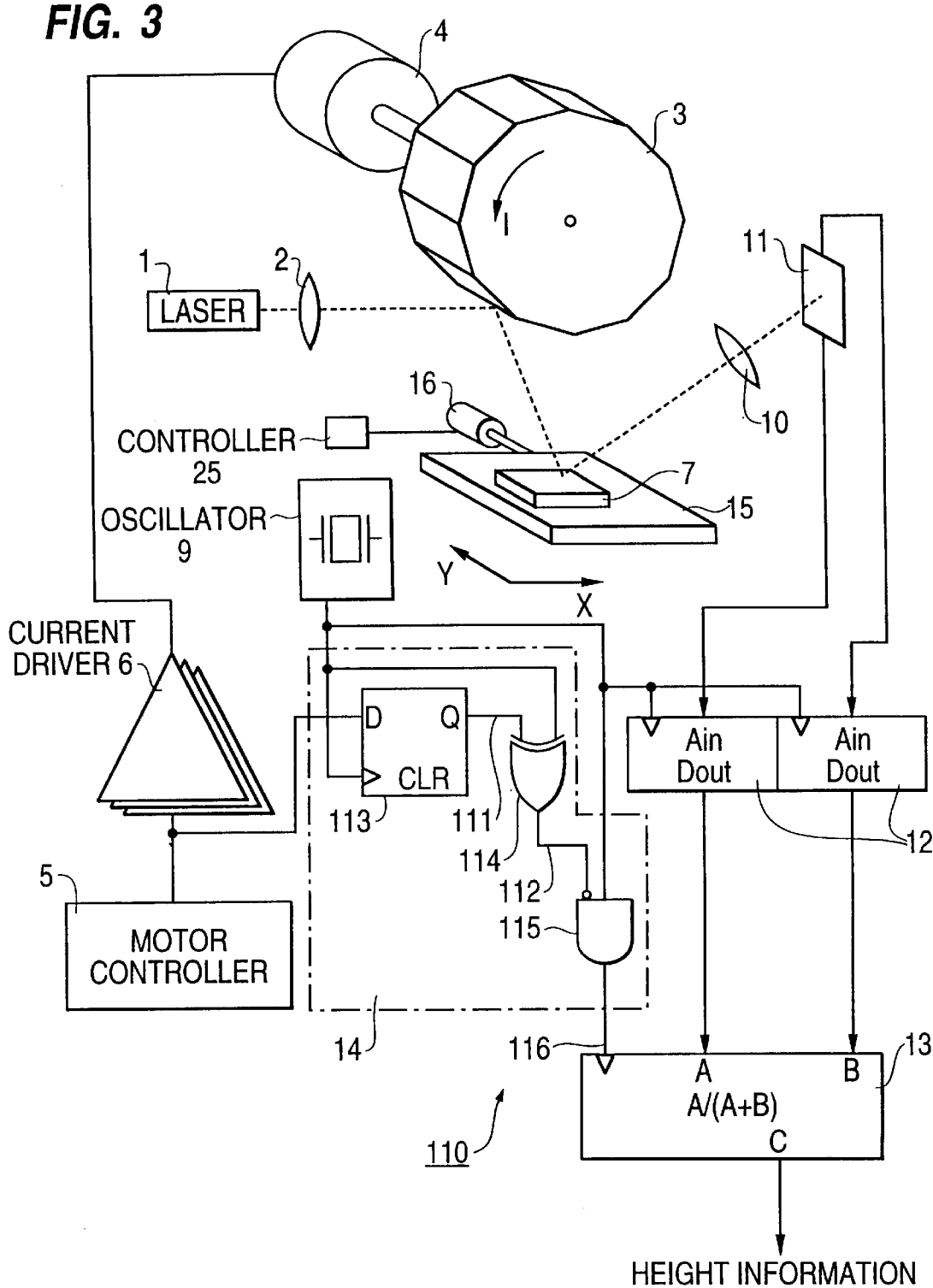

MOTOR CURRENT
(OUTPUT OF MOTOR
CONTROLLER(5))

OUTPUT OF
OSCILLATOR(9)

OUTPUT 111

OUTPUT 112

CLOCK FED TO
COMPUTING UNIT

OUTPUT OF PSD

HEIGHT DATA

OUTPUT OF MOTOR
CONTROLLER(5)

OUTPUT OF PSD(11)

OUTPUT OF
OSCILLATOR (9)

HEIGHT DATA
(OUTPUT OF
COMPUTING UNIT (13))

5,841,539

THREE-DIMENSIONAL MEASURING APPARATUS AND THREE-DIMENSIONAL MEASURING METHOD

BACKGROUND OF THE INVENTION

The present invention relates to a three-dimensional measuring apparatus, as well as a three-dimensional measuring method, for measuring the height of projections and depressions on the surface of an object to be measured. The object is exemplified by a circuit board, and the height of electronic components mounted on the circuit board is measured by the three-dimensional measuring apparatus and the three-dimensional measuring method.

There have been proposed various three-dimensional measuring apparatuses for measuring the height of projections and depressions on the surface of an object to be measured. Among them is a three-dimensional measuring apparatus in which the object is scanned with a laser beam and the resulting reflected light is received by a PSD (photo-receiving Position Sensitive Detector) or the like, by which a light-spot position that is a position on the PSD or the like of a light spot focused on the PSD or the like is detected to determine the heights by the principle of triangulation.

Hereinbelow, a conventional three-dimensional measuring apparatus as disclosed in, for example, Japanese Laid-Open Patent Publication No. 5-312536 is described with reference to the accompanying drawings.

FIG. 7 is a block diagram showing the constitution of the conventional three-dimensional measuring apparatus 30.

Referring to FIG. 7, reference numeral 1 denotes a photo-transmitting laser; 2 denotes a photo-transmitting condenser lens; 3 denotes a polygon mirror; 4 denotes a drive motor for rotating the polygon mirror 3 in the direction of an arrow I; 5 denotes a motor controller which transmits a control signal for performing operational control of the drive motor 4; 6 denotes a current driver for feeding current to the drive motor 4 in compliance with the control signal transmitted by the motor controller 5; 7 denotes an object to be measured; 9 denotes an oscillator for generating a pulse signal; 10 denotes a photo-receiving condenser lens for condensing a laser beam reflected on the surface of the object 7 being measured; 11 denotes a PSD (photo-receiving Position Sensitive Detector) for detecting a light-spot position of the laser beam condensed and focused by the condenser lens; 12 denotes an A/D (analog-to-digital) converter for converting an output signal of the PSD 11 from analog to digital form based on the pulse signal transmitted by the oscillator 9; 13 denotes a computing unit for performing calculation of height information based on an output signal of the A/D converter 12; 15 denotes a transfer table for resting thereon the object 7; and 16 denotes a pulse motor for transferring the transfer table in the Y direction; and 25 denotes a controller for controlling the driving of the pulse motor 16.

With reference to the conventional three-dimensional measuring apparatus 30 comprising the components as described above, the relationships among those components and their operation are described below.

First in the photo-transmitting system, a laser beam emitted from the photo-transmitting laser 1 passes through the photo-transmitting condenser lens 2, being applied to the polygon mirror 3. A motor current generated from the current driver 6 in compliance with the control signal transmitted by the motor controller 5 is fed to the motor 4, by which the motor 4, or the polygon mirror 3, is rotated at a constant speed in the direction of the arrow I. Accordingly, as the polygon mirror 3 rotates at the constant speed in the direction of the arrow I, the laser beam 20 reflected by the polygon mirror 3 and applied onto a surface 7a of the object 7 scans on the surface 7a of the object 7 at a constant speed in the direction of an arrow II from a scanning start position 21 to a scanning end position 22 generally along the X direction as shown in the figure.

In addition, while the surface 7a of the object 7 is scanned with a laser beam, the object 7 is transferred at a constant speed in the Y direction by the motor 16 under the control of the controller 25. Therefore, the scanning on the surface 7a with the laser beam is effected actually not in full parallelism with the X direction but in a slight inclination with respect to the X direction, as shown in FIG. 10.

Next, in the photo-receiving system, a laser beam 23 reflected by the surface 7a of the object 7 is focused on the PSD 11 by the photo-receiving condenser lens 10. In addition, the light-spot position on the PSD 11 will move responsive to the projections and depressions of the surface 7a of the object 7, as shown in FIG. 9. Therefore, detecting the amount M of movement on the PSD 11 allows the amount H of projections and depressions to be determined by the principle of triangulation.

In the photo-receiving position detecting system, outputs proportional to the position and light-quantity of a light spot focused on the PSD 11 are transmitted from output terminals 11a, 11b of the PSD 11 to the A/D converter 12. The A/D converter 12 converts the output values of the PSD 11 from analog to digital form by making use of the pulse signal transmitted by the oscillator 9, and transmits digital values A, B to the computing unit 13. The computing unit 13 is also fed with the pulse signal transmitted by the oscillator 9. The computing unit 13 performs operations based on a calculation equation, P=A/(A+B), with respect to the digital values A, B, and outputs the operation results as height information.

In the conventional three-dimensional measuring apparatus 30 as described above, the photo-transmitting system is often implemented by a system, for high-speed scanning, in which the polygon mirror 3 is rotated by the motor 4, or by a system, for low-speed scanning, in which the table with the object 7 placed thereon is moved by a pulse motor or servo motor. In these systems, in order to maintain each motor at a constant rotational speed, the motor current to be fed to the motors is frequently turned on and off. Meanwhile, since electrical noise would be generated at the turn-on and -off of the motor current, the electrical noise would have influence on the light-spot position detecting circuit, making an obstacle to improvement in the measuring accuracy of height information as a disadvantage. This is explained in more detail below with reference to FIG. 8.

Without any influence of the electrical noise, the output of the PSD 11 becomes a normal waveform 42 in which no noise signal 41 is present in a waveform as shown in FIG. 8B. The motor controller 5, on the other hand, transmits a control signal 43 as shown in FIG. 8A. In addition, the motor current is fed to the motor 4 from the current driver 6 in response to the control signal 43. Therefore, the electrical noise is generated at times t1, t3 and the like, which are rising and falling edge times of the motor current, causing the noise signal 41 to be generated in the output signal of the PSD 11. Accordingly, in the A/D converter 12, as shown by the time t2 in FIGS. 8B and 8C, if the sampling of the output signal of the PSD 11 performed at the rise of a pulse signal 44 (see FIG. 2B) fed from the oscillator 9 is effected within a time period for which the noise signal 41 remains generated, then the noise signal 41 would be sampled such that noise information 45 would be created in the height information outputted from the computing unit 13. At time t3, however, since the falling edge of the control signal 43, i.e. the falling edge of the motor current, and the rising edge of the pulse signal 44 of the oscillator 9, which is the sampling timing of the output signal of the PSD 11, are coincident with each other, the noise signal 41 is not sampled so that the height information would undergo no adverse effects. As seen above, electrical noise due to the turn-on and -off of the motor current fed to the motor 4 would deteriorate the accuracy of height information outputted by the computing unit 13.

SUMMARY OF THE INVENTION

An object of the present invention is therefore to provide a three-dimensional measuring apparatus and a three-dimensional measuring method which are capable of measuring height information with high accuracy.

In accomplishing these and other aspects, according to a first aspect of the present invention, there is provided a three-dimensional measuring apparatus comprising: an optical beam scanning unit for scanning a projected-and-depressed surface of an object to be measured, with an optical beam while controlling scanning operation; and a detector unit for receiving a reflected optical beam reflected by the projected-and-depressed surface through the scanning operation, thereby obtaining height information about projections and depressions of the object, and transmitting the height information from the detector unit, excluding noise information due to noise generated during the control of the scanning operation with the optical beam in the optical beam scanning unit.

According to a second aspect of the present invention, there is provided a three-dimensional measuring apparatus comprising: an optical beam scanning unit for scanning a projected-and-depressed surface of an object to be measured, with an optical beam while controlling scanning operation; a detector unit for receiving a reflected optical beam reflected by the projected-and-depressed surface through the scanning operation and thereby obtaining height information about projections and depressions of the object; and an information-transmission adjusting unit for transmitting the height information from the detector unit, excluding noise information due to noise generated during the control of the scanning operation with the optical beam in the optical beam scanning unit.

According to a third aspect of the present invention, there is provided a three-dimensional measuring apparatus according to the second aspect, wherein the information-transmission adjusting unit is a synchronizing unit for synchronizing a noise-generation timing at which the noise is generated during the control of the scanning operation and a sampling timing of the height information in the detector unit with each other.

According to a fourth aspect of the present invention, there is provided a three-dimensional measuring apparatus according to the third aspect, further comprising an oscillator for generating a pulse signal which is ted to the detector unit to determine the sampling timing, the optical beam scanning unit comprising: an optical-beam generating source; a reflecting surface for reflecting an optical beam emitted from the optical-beam generating source; a reflecting-surface drive unit for moving the reflecting surface so that an angle of reflection of the optical beam with respect to the reflecting surface is changed so as to allow the projected-and-depressed surface to be scanned with the laser beam; and a drive control signal generating unit for transmitting a drive control signal to the reflecting-surface drive unit in compliance with the control of the scanning operation to accomplish the control of the scanning operation with the optical beam by controlling the drive of the reflecting surface, wherein the pulse signal transmitted by the oscillator is fed to the synchronizing unit, and the synchronizing unit makes the drive control signal transmitted from the drive control signal generating unit in synchronization with the fed pulse signal.

According to a fifth aspect of the present invention, there is provided a three-dimensional measuring apparatus according to the second aspect, wherein the information-transmission adjusting unit is an invalidating unit for invalidating the height information for the detector unit during noise-generation periods in which the noise is generated during the control of the scanning operation in the optical beam scanning unit.

According to a sixth aspect of the present invention, there is provided a three-dimensional measuring apparatus according to any one of the second to fifth aspects, further comprising a transfer unit for transferring the object in a direction perpendicular to a direction of scanning with the optical beam only when the scanning with an optical beam by the optical beam scanning unit is out of operation, so that an area of scanning is changed.

According to a seventh aspect of the present invention, there is provided a three-dimensional measuring method comprising: scanning a projected-and-depressed surface of an object to be measured, with an optical beam while controlling scanning operation; receiving a reflected optical beam reflected by the projected-and-depressed surface through the scanning operation; thereby obtaining height information about projections and depressions of the object; and transmitting the height information excluding noise information due to noise generated during the control of the scanning operation with the optical beam.

According to an eighth aspect of the present invention, there is provided a three-dimensional measuring method according to the seventh aspect, wherein in the transmission of the height information excluding the noise information, a noise-generation timing at which the noise is generated during the control of the scanning operation and a sampling timing of the height information are synchronized with each other.

According to a ninth aspect of the present invention, there is provided a three-dimensional measuring method according to the seventh aspect, wherein in the transmission of the height information excluding the noise information, the height information is invalidated during noise-generation periods in which the noise is generated during the control of the scanning operation.

BRIEF DESCRIPTION OF THE DRAWINGS

These and other aspects and features of the present invention will become clear from the following description taken in conjunction with the preferred embodiments thereof with reference to the accompanying drawings, in which:

FIGS. 2A, 2B, 2C, 2D, and 2E are timing charts for explaining the operation of the three-dimensional measuring apparatus shown in FIG. 1;

FIG. 3 is a block diagram showing the constitution of a three-dimensional measuring apparatus which is a second embodiment of the present invention;

DETAILED DESCRIPTION OF THE PREFERRED EMBODIMENTS

Figure 1:
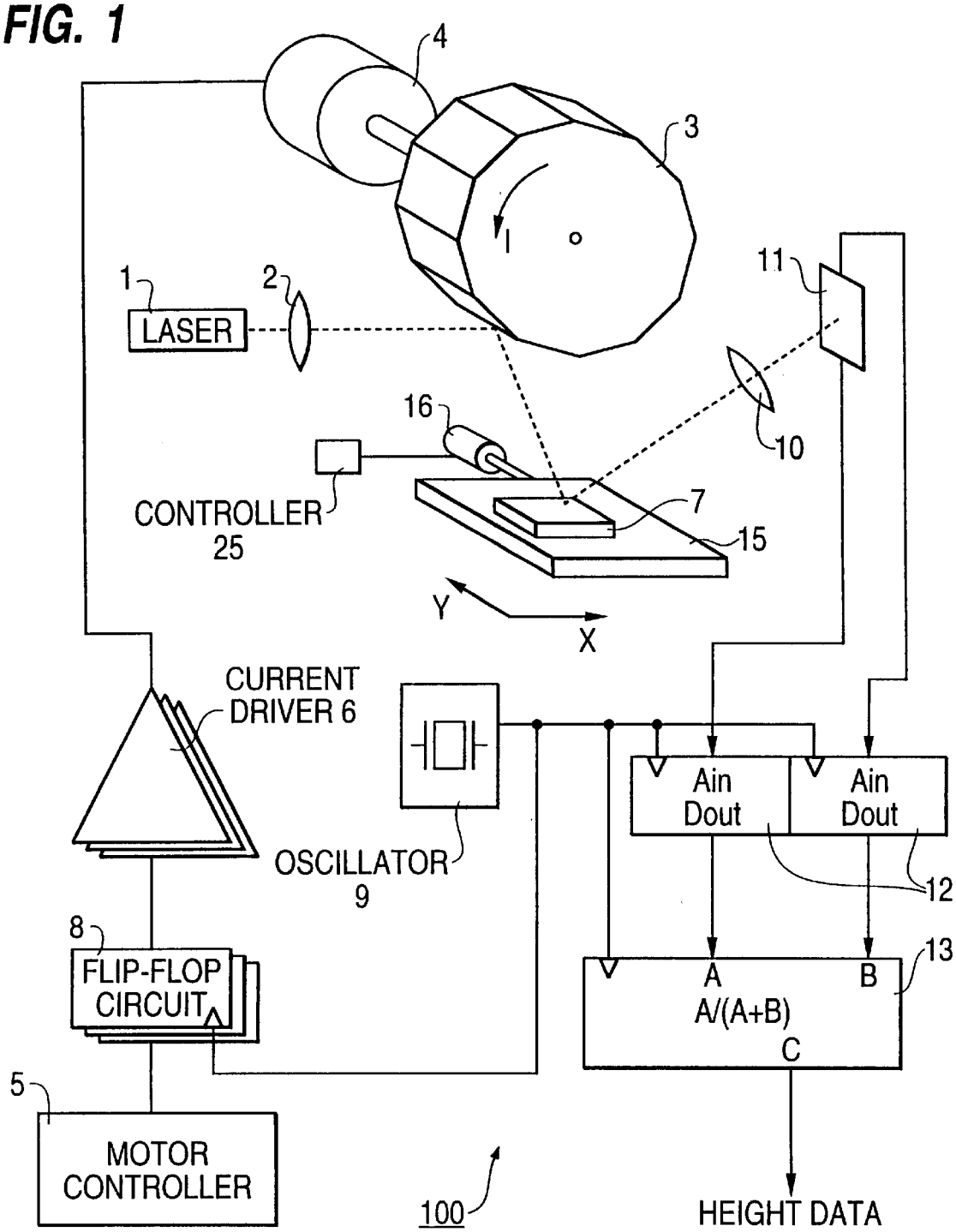
FIG. 1 is a block diagram showing the constitution of a three-dimensional measuring apparatus which is a first embodiment of the present invention.

Before the description of the present invention proceeds, it is to be noted that like parts are designated by like reference numerals throughout the accompanying drawings.

A three-dimensional measuring apparatus which is a first embodiment of the present invention, as well as a three-dimensional measuring method to be executed by the three-dimensional measuring apparatus, are now described below with reference to the accompanying drawings. It is noted that like components are designated by like numerals throughout the drawings and their description is omitted.

In the embodiments of the present invention, the function of the optical beam scanning unit is fulfilled, as an example, by the photo-transmitting laser 1, the photo-transmitting condenser lens 2, the polygon mirror 3, the drive motor 4, the motor controller 5, and the current driver 6 as described above. Also in the embodiments of the present invention, the function of the detector unit is fulfilled, as an example, by the photo-receiving condenser lens 10, the PSD 11, the A/D converter 12, and the computing unit 13 as described above.

The function of the information-transmission adjusting unit is fulfilled, as an example, by a flip-flop circuit 8, an invalidating unit 14, and a controller 17 in later-described embodiments.

The function of the reflecting-surface drive unit is fulfilled, as an example, by the drive motor 4 in the embodiments of the present invention.

The function of the drive control signal generator is fulfilled, as an example, by the motor controller 5 and the current driver 6 in the embodiments of the present invention.

The function of the transfer control unit is fulfilled, as an example, by the pulse motor 16 and the controller 17 in the embodiments of the present invention.

Noise will be generated by the motor current of the drive system as described above. However, the first embodiment is designed to obtain the synchronization between the generation timing of the noise and the sampling timing of the A/D converter 12 for adjustment of the transmission of information so that the noise will not be transmitted as the height information. As an example of fulfilling the function of equipment that implements such synchronization, a flip-flop circuit 8 is provided in this embodiment as described below.

Figure 7:
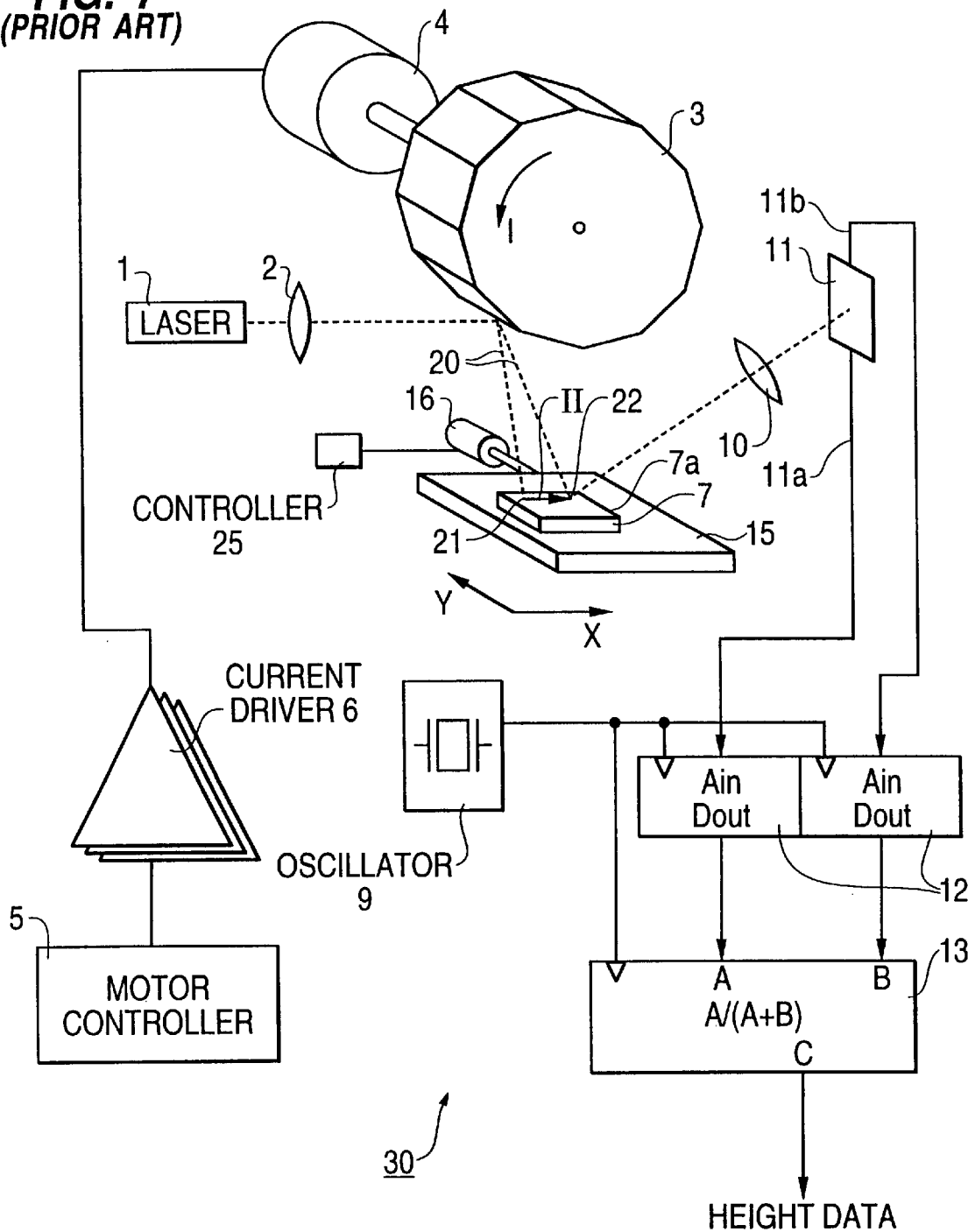
FIG. 7 is a block diagram showing the constitution of a conventional three-dimensional measuring apparatus.
Figure 8A:
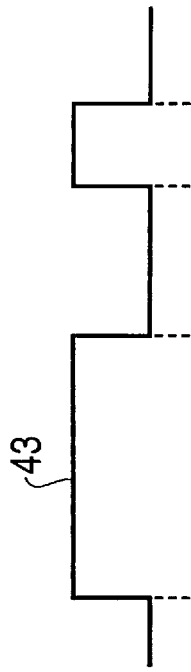
FIGS. 8A, 8B, 8C, and 8D are timing charts for explaining the operation of the three-dimensional measuring apparatus shown in FIG. 7.
Figure 8B:
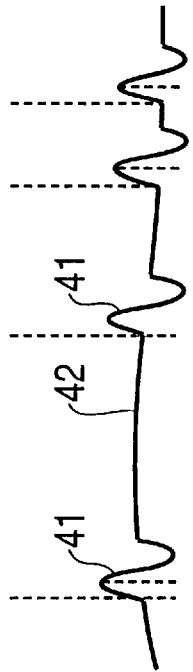
Figure 8C:
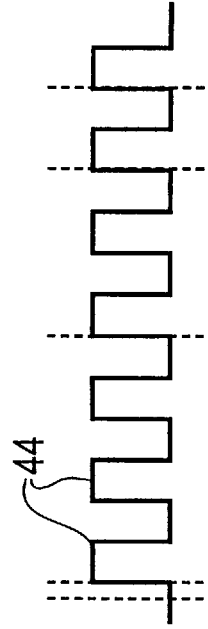
Figure 8D:
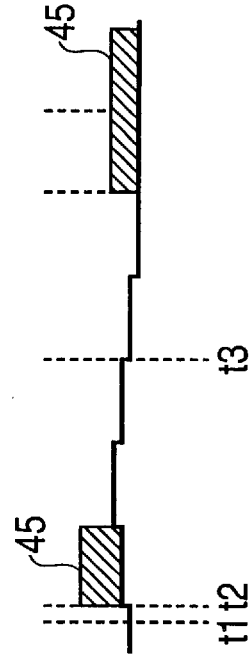
Figure 9:
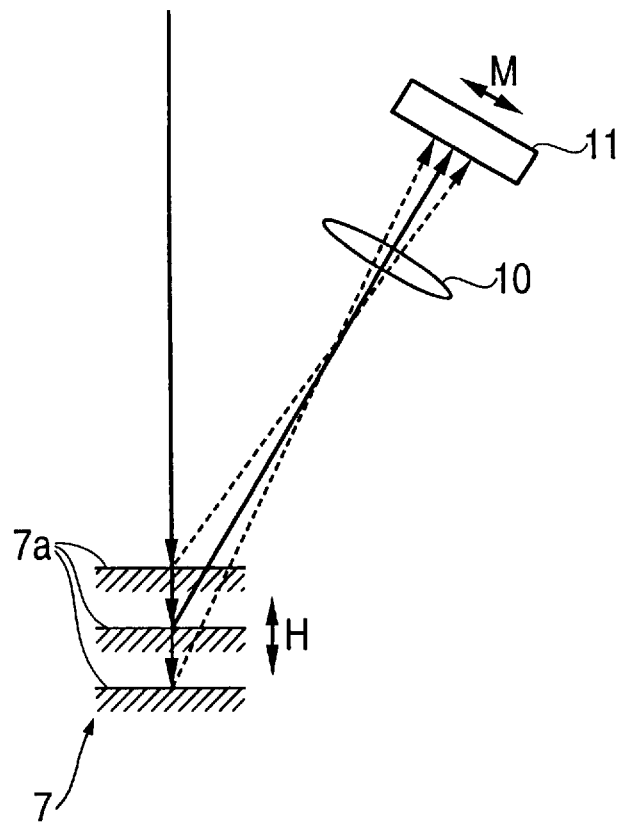
FIG. 9 is a view showing the principle for obtaining height information from projections and depressions of the surface of the object.
Figure 10:
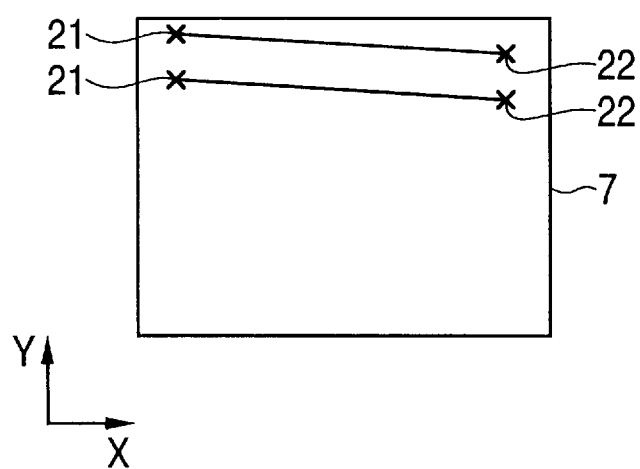
FIG. 10 is a view showing the direction of scanning on the object in the three-dimensional measuring apparatus as shown in FIG. 7.

The three-dimensional measuring apparatus 100 in this embodiment, as shown in FIG. 1, differs from the conventional three-dimensional measuring apparatus 30, as shown in FIG. 7, in that a flip-flop circuit 8, which performs data latch operation responsive to a control signal outputted from the motor controller 5 for controlling the turning-on and -off timing of the motor current, is provided on the output side of the motor controller 5 and on the input side of the current driver 6. The rest of the constitution is the same as that of the conventional three-dimensional measuring apparatus 30. The flip-flop circuit 8 is fed with a pulse signal transmitted by the oscillator 9 as a clock signal. It is noted that the function of the drive control signal is fulfilled, as an example, by the motor current transmitted by the current driver 6.

The operation of the three-dimensional measuring apparatus 100 having the aforementioned constitution is now described below.

As shown in FIG. 2A, the motor controller 5 starts to transmit a control signal 43 to the flip-flop circuit 8, for example, at time t1 as in the prior art. Since the flip-flop circuit 8 is fed with a pulse signal 44 transmitted by the oscillator 9 as a clock signal, the flip-flop circuit 8 operates in synchronism with the pulse signal 44. Therefore, the flip-flop circuit 8 transmits the control signal 43 to the current driver 6 in synchronization with the pulse signal 44. Accordingly, the current driver 6 starts to transmit a motor current 101 to the motor 4, not from the time t1 when the motor controller 5 has started to transmit the control signal, but from time t2 in synchronization with the pulse signal of the oscillator 9 as shown in FIG. 2C.

By the motor current 101 flowing from the current driver 6 to the motor 4, a noise signal 102 begins to be generated in the output of the PSD 11 over a specified time period from a time point, for example t2, which is the rising edge time of the motor current 101 as shown in FIG. 2D. In addition, the noise signal 41 depicted by dotted line in FIG. 2D shows a case of the prior art.

Meanwhile, since the pulse signal 44 transmitted by the oscillator 9 is also fed to the A/D converter 12 and the computing unit 13, the timing at which the output signal of the PSD 11 is sampled by the A/D converter 12 is synchronized with the pulse signal 44. Therefore, whereas the noise signal 102 begins to be generated in the output of the PSD 11 at time t2 as described above, the A/D converter 12 samples the output signal of the PSD 11 at the time t2, so that the noise signal 102 will never have any influence as on height information. Also, as shown in FIGS. 2A, 2C, 2D, the sampling of the output signal of the PSD 11 is effected even at a falling edge of the motor current 101, as it is at time t6. Thus, the resulting height information transmitted from the computing unit 13 is free from any effect of noise as shown in FIG. 2E.

As seen above, the three-dimensional measuring apparatus 100 of this embodiment is enabled to measure height information with high accuracy.

Although the digital computing unit 13 has been used to compute the light-spot position in this embodiment, an analog computing unit may be used instead.

It is also possible that a delay element to which the pulse signal of the oscillator 9 is fed is provided so that a delayed pulse signal is transmitted to the A/D converter 12 and the flip-flop circuit 8, in by which way the sampling timing in the A/D converter 12 as well as the timing at which the current driver 6 transmits the motor current are fine-tune adjusted.

Besides, also for the driving of the pulse motor 16, the flip-flop circuit 8 may be used to perform the above operation.

It is also possible that the control signal 43 to be transmitted by the motor controller 5 is generated based on the pulse signal 44 transmitted by the oscillator 9. In this case, there is no need of providing the above-described flip-flop circuit 8.

Next, a three-dimensional measuring apparatus 110 according to a second embodiment of the present invention is described. In this three-dimensional measuring apparatus 110, with a view towards adjusting the transmission of the height information so that the noise as mentioned above will not be transmitted as the height information, there is provided an invalidating unit 14 for invalidating any noise information attributable to noise generated during the control of the scanning operation. Note that, as shown in FIG. 3, the three-dimensional measuring apparatus 110 is similar in construction to the conventional three-dimensional measuring apparatus 30 shown in FIG. 7 except that the invalidating unit 14 is provided.

As shown in FIG. 3, the invalidating unit 14 comprises a flip-flop circuit 113, an XOR (exclusive-OR) circuit 114 and an AND circuit 115. The flip-flop circuit 113, to which the pulse signal 44 transmitted by the oscillator 9 is fed as a clock signal, is fed with the control signal 43 transmitted by the motor controller 5, and the resulting output is transmitted to one input terminal of the XOR circuit 114, the other input terminal of which is fed with the pulse signal 44 of the oscillator 9. The output of the XOR circuit 114 is transmitted to one input terminal of the AND circuit 115, the other input terminal of which is fed with the pulse signal 44 of the oscillator 9. The output of the AND circuit 115 is transmitted to the computing unit 13 as a clock signal. The invalidating unit 14 having the aforementioned constitution will not transmit a clock signal to the computing unit 13 during periods in which the noise has been generated, as will be described later.

The operation of the three-dimensional measuring apparatus 110 constructed as described above is explained below. Its operations, except those related to the invalidating unit 14, are similar to those of the conventional three-dimensional measuring apparatus 30. Therefore, the following description will be made primarily on the operations related to the invalidating unit 14.

Figure 4A:
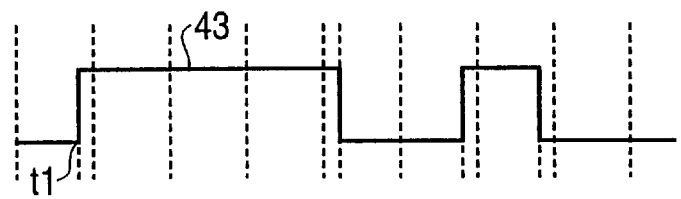
FIGS. 4A, 4B, 4C, 4D, 4E, 4F, and 4G are timing charts for explaining the operation of the three-dimensional measuring apparatus shown in FIG. 3.
Figure 4B:
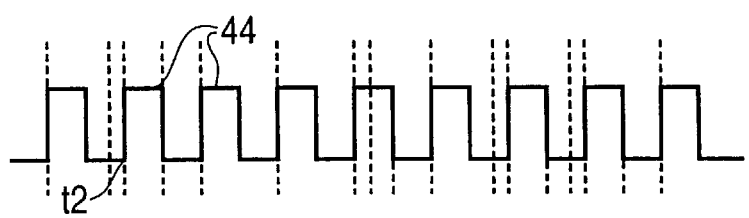
Figure 4C:
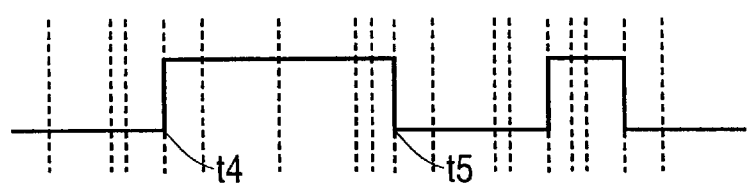
Figure 4D:
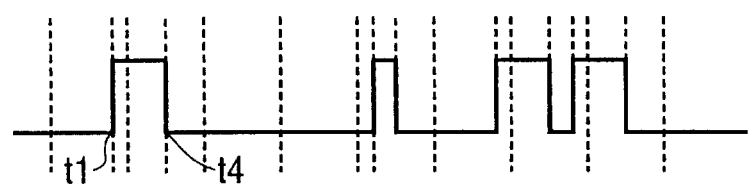
Figure 4E:
Figure 4F:
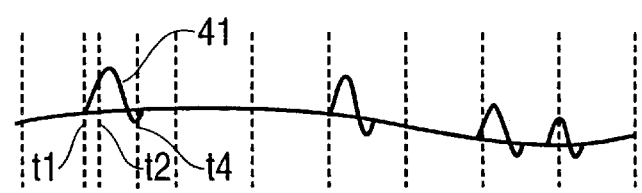

As shown in FIG. 4A, the current driver 6 starts to pass the current to the motor 4 at time t1 in compliance with the control signal 43 transmitted by the motor controller 5. Accordingly, as described above and as shown in FIG. 4F, the noise signal 41 keeps being generated in the output signal of the PSD 11 over a specified time period starting at time t1. Meanwhile, since the flip-flop circuit 113, the data terminal of which is fed with the control signal 43 transmitted by the motor controller 5, receives the pulse signal 44 (see FIG. 4B) of the oscillator 9 as a clock signal, the resulting output signal 111 starts to rise at time t4 as shown in FIG. 4C. Such an output signal 111 of the flip-flop circuit 113 is transmitted to one input terminal of the XOR circuit 114, the other input terminal of which is fed with the pulse signal 44 of the oscillator 9. Thus, an output signal 112 of the XOR circuit 114 results in a signal that keeps risen for the period from time t1 to time t4 as shown in FIG. 4D. Such an output signal 112 of the XOR circuit 114 is inverted and fed to the one input terminal of the AND circuit 115. Since the other input terminal of the AND circuit 115 is fed with the pulse signal 44 transmitted by the oscillator 9, a clock signal 116 will never be transmitted from the AND circuit 115 to the computing unit 13 during the period from time t1 to time t4 as shown in FIG. 4E.

As described above, the noise signal 41 is fed to the computing unit 13 over a specified time period starting at time t1. However, because the clock signal 116 is not transmitted from the AND circuit 115 to the computing unit 13 during the period from time t1 to time t4, the information fed to the computing unit 13 during the period from time t1 to time t4 is invalidated. Accordingly, the computing unlit 13 will not transmit the information ted during the period from time t1 to time t4 as height information. As a result, the noise signal 41 will never be transmitted outside as height information. In this way, the three-dimensional measuring apparatus 110 is enabled to measure height information at high accuracy without being affected by noise due to the motor current.

Figure 4G:
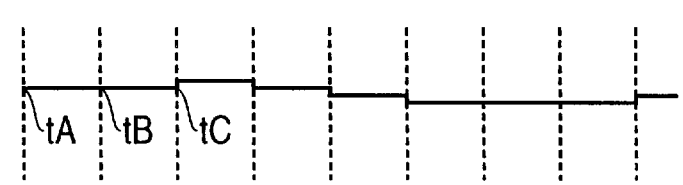

As the height information for periods involving the invalidation of information, the computing unit 13 transmits height information, for example, at time tA as shown in FIG. 4G. Otherwise, it is also possible that the computing unit 13 does not transmit the height information at the time tA as it is, but does transmit height information of higher accuracy obtained by executing an interpolation, such as average values between height information at time tA and height information at time tC or information averaged from height information at time tB before and after one scan in the Y direction.

Further, the constitution of the second embodiment enables a scanning of higher accuracy to be accomplished because of less influences upon the control of the drive system, as compared with the constitution of the first embodiment.

Next, a three-dimensional measuring apparatus 120 according to a third embodiment of the present invention is described with reference to FIG. 5.

In the three-dimensional measuring apparatuses 100, 110 of the first and second embodiments as described above, the surface 7a of the object 7 is scanned with a laser beam while the object 7 is moved in the Y direction at constant speed, as in the conventional three-dimensional measuring apparatus 30. Therefore, noise would also be generated due to the motor current fed to the motor 16 as shown in FIGS. 1 and 3, affecting the output signal of the PSD 11. In view of this, the three-dimensional measuring apparatus 120 of this embodiment has been devised so that the output signal of the PSD 11 will not be affected even by any noise due to the motor current fed to the motor 16 for moving the object 7 in the Y direction. FIG. 5 shows a constitution which is based on that of the three-dimensional measuring apparatus 100 in the first embodiment, and in which the output signal of the PSD 11 will not be affected even by any noise due to the motor current fed to the motor 16 for movement in the Y direction. However, the constitution may be based also on that of the three-dimensional measuring apparatus 110 in the second embodiment. Besides, the constitution may be only that of the three-dimensional measuring apparatus 120 of the present third embodiment without having the constitution of the three-dimensional measuring apparatus 100 or 110.

The constitution of the three-dimensional measuring apparatus 120 in this embodiment is now described below.

Figure 5:
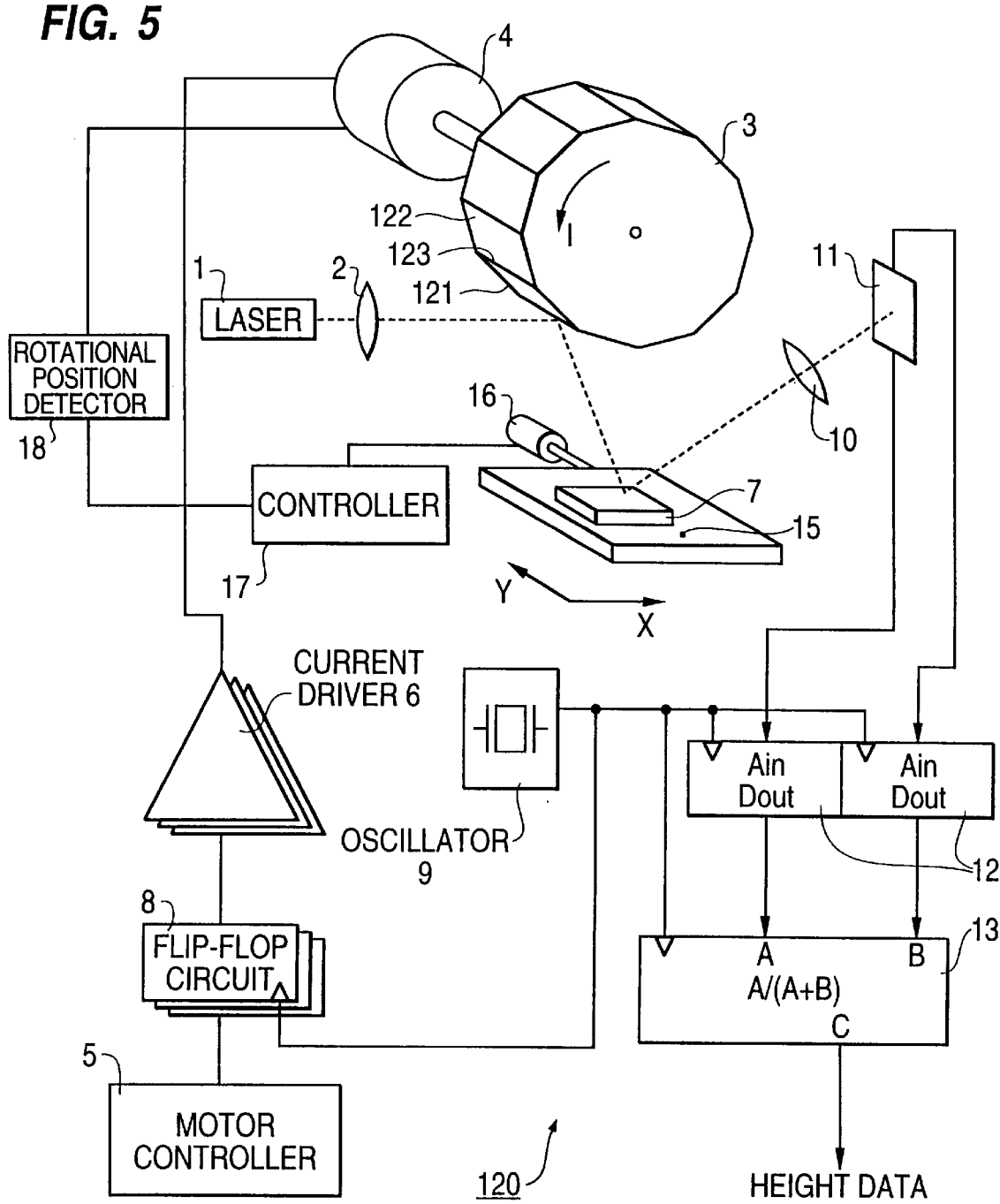
FIG. 5 is a block diagram showing the constitution of a three-dimensional measuring apparatus which is a third embodiment of the present invention.

The three-dimensional measuring apparatus 120 as shown in FIG. 5, as compared with the constitution of the three-dimensional measuring apparatus 100 as shown in FIG. 1, comprises a controller 17 instead of the controller 25 that controls the driving of the pulse motor 16 and besides a rotational position detector 18 for detecting a rotational position of the motor 4 and transmitting the resulting detection signal to the controller 17. The rest of the constitution is the same as in the three-dimensional measuring apparatus 100 and is therefore omitted in description.

The operation of the three-dimensional measuring apparatus 120 constituted as described above is now explained.

Figure 6:
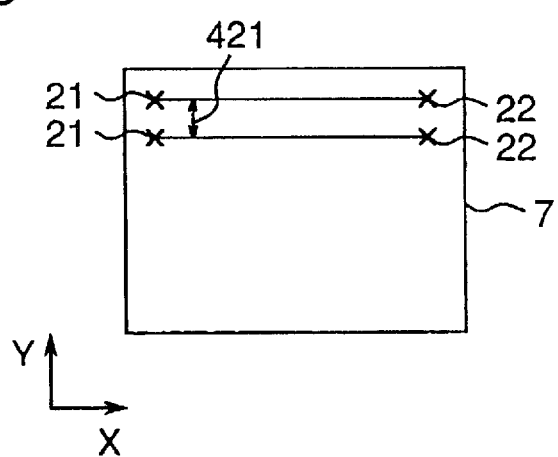
FIG. 6 is a view showing the direction of scanning on an object to be measured in the three-dimensional measuring apparatus shown in FIG. 5.

The polygon mirror 3 is formed into a polygonal shape as shown in the figure. Therefore, while the laser beam continues being applied to a boundary 123 between a reflecting mirror 121 and a reflecting mirror 122 adjacent to each other, the scanning on the object 7 will not be effected. Thus, by feeding from the rotational position detector 18 to the controller 17 a signal representing the period for which the laser beam continues being applied to the boundary 123, the controller 17 transmits a motor current to the motor 16, only during the periods in which the laser is applied to the boundary, so that the transfer table 15 will be moved by a specified distance 421 in the Y direction as shown in FIG. 6. Whereas noise would be generated upon the transmission of the motor current to the pulse motor 16, the scanning is not effected at that time so that even if noise is mixed into the output signal of the PSD 11, the noise will never be transmitted as height information. On the other hand, while the surface 7*a* of the object 7 is scanned with the laser beam along the X direction, the motor current will never be fed to the pulse motor 16 so that noise due to the motor current fed to the pulse motor 16 will never be generated in the output signal of the PSD 11.

As to noise due to the motor current fed to the motor 4, the noise will never be outputted from the computing unit 13 as height information because the timing of generation of noise and the timing of sampling of the output signal of the PSD 11 are synchronized with each other, as described before on the three-dimensional measuring apparatus 100 of the first embodiment. Therefore, the three-dimensional measuring apparatus 120 is enabled to measure the height information with higher accuracy and to achieve high-accuracy measurement by virtue of its being capable of higher-accuracy sampling, for example, when the sampling period is so short that noise cannot be eliminated within the period.

As described in detail above, according to the three-dimensional measuring apparatuses of the first and second aspects of the present invention, as well as the three-dimensional measuring method of the seventh aspect of the present invention, height information is transmitted excluding noise information due to the noise generated during the control of scanning operation with an optical beam directed to the object. This makes it possible to provide a three-dimensional measuring apparatus and method capable of measuring height information with high accuracy.

According to the three-dimensional measuring apparatus and method of the third and eighth aspects of the present invention, because the noise generation timing, at which noise is generated, and the timing of sampling of height information in the detector unit are synchronized with each other, the noise will never be sampled at the timing of sampling. Thus, there can be provided a three-dimensional measuring apparatus and method each of which is capable of preventing noise information from mixing into the outputted height information, and of measuring height information with high accuracy.

Also according to the three-dimensional measuring apparatus and method of the fifth and ninth aspects of the present invention, since the height information including noise is invalidated during noise-generation periods in which noise is generated, there is no possibility that height information including the noise is transmitted as the height information. Thus, there can be provided a three-dimensional measuring apparatus and method capable of measuring height information with high accuracy.

The entire disclosure of Japanese Patent Application No. 8-210914 filed on Aug. 9, 1996, including specification, claims, drawings, and summary are incorporated herein by reference in its entirety.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims.

What is claimed is:

1. A three-dimensional measuring apparatus comprising:
   an optical beam scanning unit for scanning a projected-and-depressed surface of an object to be measured with an optical beam while controlling a scanning operation; and
   a detector unit for receiving a reflected optical beam reflected by the projected-and-depressed surface through the scanning operation, thereby obtaining height information about projections and depressions of the object, and transmitting the height information from the detector unit excluding noise information due to noise generated during the control of the scanning operation with the optical beam in said optical beam scanning unit.

2. A three-dimensional measuring apparatus comprising:
   an optical beam scanning unit for scanning a projected-and-depressed surface of an object to be measured with an optical beam while controlling a scanning operation;
   a detector unit for receiving a reflected optical beam reflected by the projected-and-depressed surface through the scanning operation and thereby obtaining height information about projections and depressions of the object; and
   an information-transmission adjusting unit for transmitting the height information from said detector unit excluding noise information due to noise generated during the control of the scanning operation with the optical beam in said optical beam scanning unit.

3. A three-dimensional measuring apparatus according to claim 2, wherein said information-transmission adjusting unit is a synchronizing unit for synchronizing a noise-generation timing at which the noise is generated during the control of the scanning operation and a sampling timing of the height information in said detector unit with each other.

4. A three-dimensional measuring apparatus according to claim 3, further comprising an oscillator for generating a pulse signal which is fed to said detector unit to determine the sampling timing;
   wherein said optical beam scanning unit further comprises: an optical-beam generating source; a reflecting surface for reflecting an optical beam emitted from said optical-beam generating source; a reflecting-surface drive unit for moving said reflecting surface so that an angle of reflection of the optical beam with respect to said reflecting surface is changed so as to allow the projected-and-depressed surface to be scanned with the optical beam; and a drive control signal generating unit for transmitting a drive control signal to said reflecting-surface drive unit in compliance with the control of the scanning operation to accomplish the control of the scanning operation with the optical beam by controlling the drive of said reflecting surface; and wherein the pulse signal transmitted by said oscillator is fed to said synchronizing unit, and said synchronizing unit makes the drive control signal transmitted from said drive control signal generating unit in synchronization with the fed pulse signal.

5. A three-dimensional measuring apparatus according to claim 4, further comprising a transfer unit for transferring the object in a direction perpendicular to a direction of scanning with the optical beam only when the scanning with the optical beam by said optical beam scanning unit is out of operation, so that an area of scanning is changed.

6. A three-dimensional measuring apparatus according to claim 3, further comprising a transfer unit for transferring the object in a direction perpendicular to a direction of scanning with the optical beam only when the scanning with the optical beam by said optical beam scanning unit is out of operation, so that an area of scanning is changed.

7. A three-dimensional measuring apparatus according to claim 2, wherein said information-transmission adjusting unit is an invalidating unit for invalidating the height information for the detector unit during noise-generation periods in which said noise is generated during the control of the scanning operation in said the optical beam scanning unit.

8. A three-dimensional measuring apparatus according to claim 5, further comprising a transfer unit for transferring the object in a direction perpendicular to a direction of scanning with said optical beam only when the scanning with the optical beam by the optical beam scanning unit is out of operation, so that an area of scanning is changed.

9. A three-dimensional measuring apparatus according to claim 2, further comprising a transfer unit for transferring the object in a direction perpendicular to a direction of scanning with the optical beam only when the scanning with the optical beam by said optical beam scanning unit is out of operation, so that an area of scanning is changed.

10. A three-dimensional measuring method comprising:

scanning a projected-and-depressed surface of an object to be measured with an optical beam while controlling scanning operation;

receiving a reflected optical beam reflected by the projected-and-depressed surface through the scanning operation thereby obtaining height information about projections and depressions of the object; and transmitting the height information excluding noise information due to noise generated during the control of the scanning operation with the optical beam.

11. A three-dimensional measuring method according to claim 10, wherein in said transmitting of the height information excluding the noise information, a noise-generation timing at which the noise is generated during the control of the scanning operation and a sampling timing of the height information are synchronized with each other.

12. A three-dimensional measuring method according to claim 10, wherein in said transmitting of the height information excluding the noise information, the height information is invalidated during noise-generation periods in which the noise is generated during the control of the scanning operation.

* * * * *